United States Patent
Hino (10) Patent No.: US 8,357,071 B2
(45) Date of Patent: Jan. 22, 2013

(54) PLANETARY GEAR MECHANISM FOR A BICYCLE INTERNAL HUB TRANSMISSION

(75) Inventor: Tetsuya Hino, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/749,077

(22) Filed: Mar. 29, 2010

(65) Prior Publication Data

US 2011/0237384 A1    Sep. 29, 2011

(51) Int. Cl.
*F16H 57/08* (2006.01)
(52) U.S. Cl. .......................... 475/344; 475/338
(58) Field of Classification Search ............... 475/338, 475/344; 74/458
See application file for complete search history.

(56) References Cited

U.S. PATENT DOCUMENTS

| | | | | |
|---|---|---|---|---|
| 1,400,687 A | * | 12/1921 | Kurtz | 475/272 |
| 1,861,258 A | * | 5/1932 | Bethune | 74/466 |
| 1,989,663 A | * | 2/1935 | Bethune | 74/466 |
| 2004/0049919 A1 | * | 3/2004 | Puetz et al. | 29/893 |
| 2009/0005211 A1 | * | 1/2009 | Hino | 475/318 |
| 2009/0170654 A1 | | 7/2009 | Hino | |

FOREIGN PATENT DOCUMENTS

| | | | |
|---|---|---|---|
| JP | 05060204 A | * | 3/1993 |
| JP | 2002-066686 A | | 3/2002 |
| JP | 2004-066257 A | | 3/2004 |
| JP | 2008-080406 A | | 4/2008 |

* cited by examiner

*Primary Examiner* — David D Le
*Assistant Examiner* — Erin D Bishop
(74) *Attorney, Agent, or Firm* — Global IP Counselors, LLP (57) ABSTRACT

A planetary gear mechanism for a bicycle internal hub transmission that includes at least one stepped planetary gear. The stepped planetary gear has a plurality of first helical gear teeth with a first outer diameter and a plurality of second helical gear teeth with a second outer diameter that is greater than the first outer diameter. The first helical gear teeth have a first helix angle and the second gear teeth have a second helix angle with the first and second helix angles being angled such that for a given amount of rotation of the stepped planetary gear corresponding travel points on the first and second helical gear teeth move the same axial amount with respect to the rotational axis the stepped planetary gear.

20 Claims, 6 Drawing Sheets

PLANETARY GEAR MECHANISM FOR A BICYCLE INTERNAL HUB TRANSMISSION

BACKGROUND

1. Field of the Invention

This invention generally relates to a planetary gear mechanism for a bicycle internal hub transmission. More specifically, the present invention relates to planetary gear mechanism that includes a stepped planetary gear.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

SUMMARY

One aspect is to provide a planetary gear mechanism with a stepped planetary gear that includes two sets of helical gear teeth.

Another aspect is to provide a stepped planetary gear that includes two sets of helical gear teeth, where the helical gear teeth are provided with relative helical angles that make the planetary gear less expensive to manufacture with fewer manufacturing steps.

In view of the state of the known technology, a planetary gear mechanism for a bicycle internal hub transmission is provided with at least one stepped planetary gear having a plurality of first helical gear teeth with a first outer diameter and a plurality of second helical gear teeth with a second outer diameter that is greater than the first outer diameter. The first helical gear teeth have a first helix angle and the second gear teeth have a second helix angle. The first and second helix angles are angled such that for a given amount of rotation of the stepped planetary gear corresponding travel points on the first and second helical gear teeth move the same axial amount with respect to the rotational axis of the stepped planetary gear.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
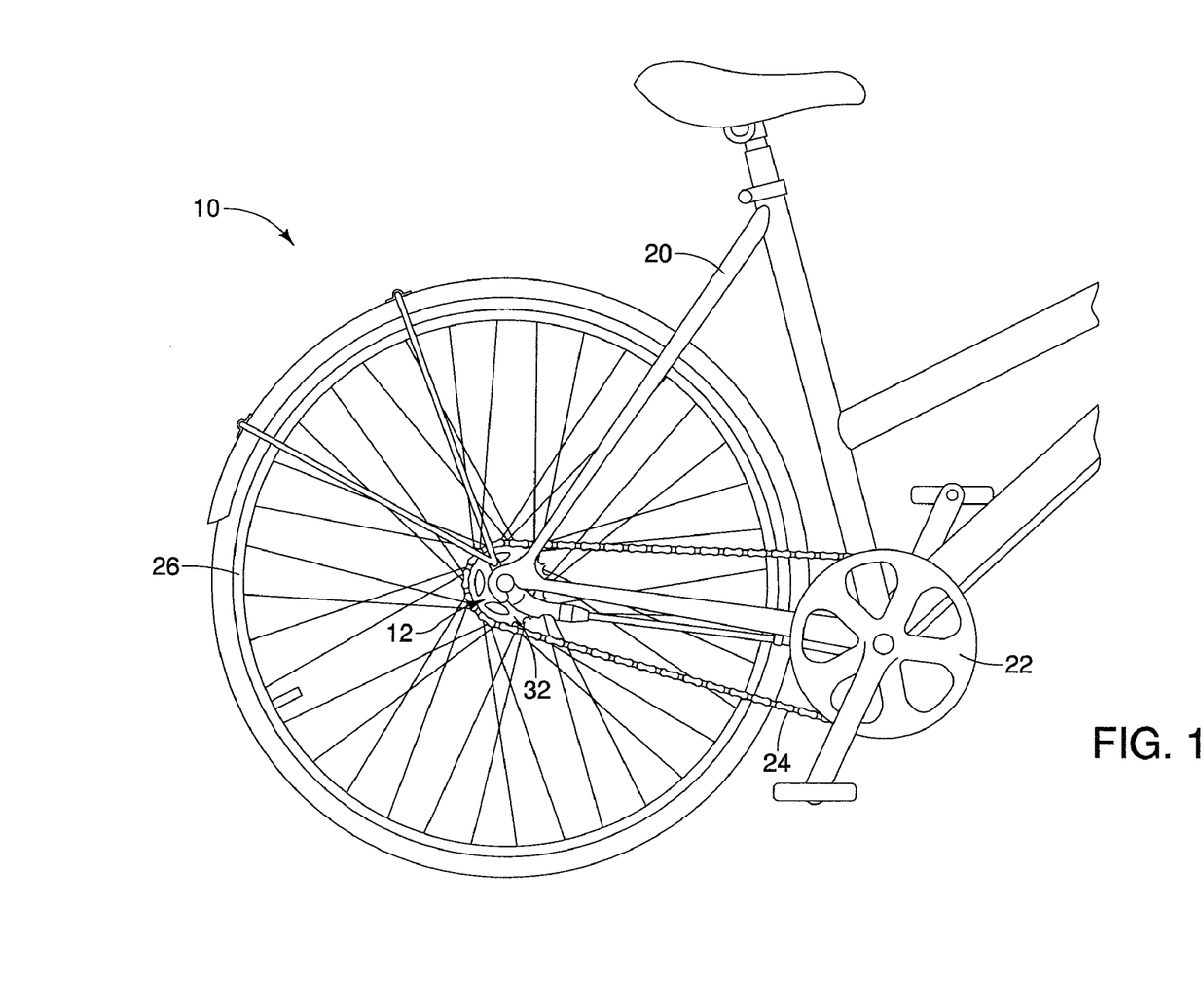
FIG. 1 is a side elevational view of a bicycle that is equipped with an internal hub transmission having a planetary gear mechanism in accordance with one embodiment.

Referring initially to FIG. 1, a bicycle 10 is illustrated with an internal hub transmission 12 in accordance with a first embodiment.

Figure 2:
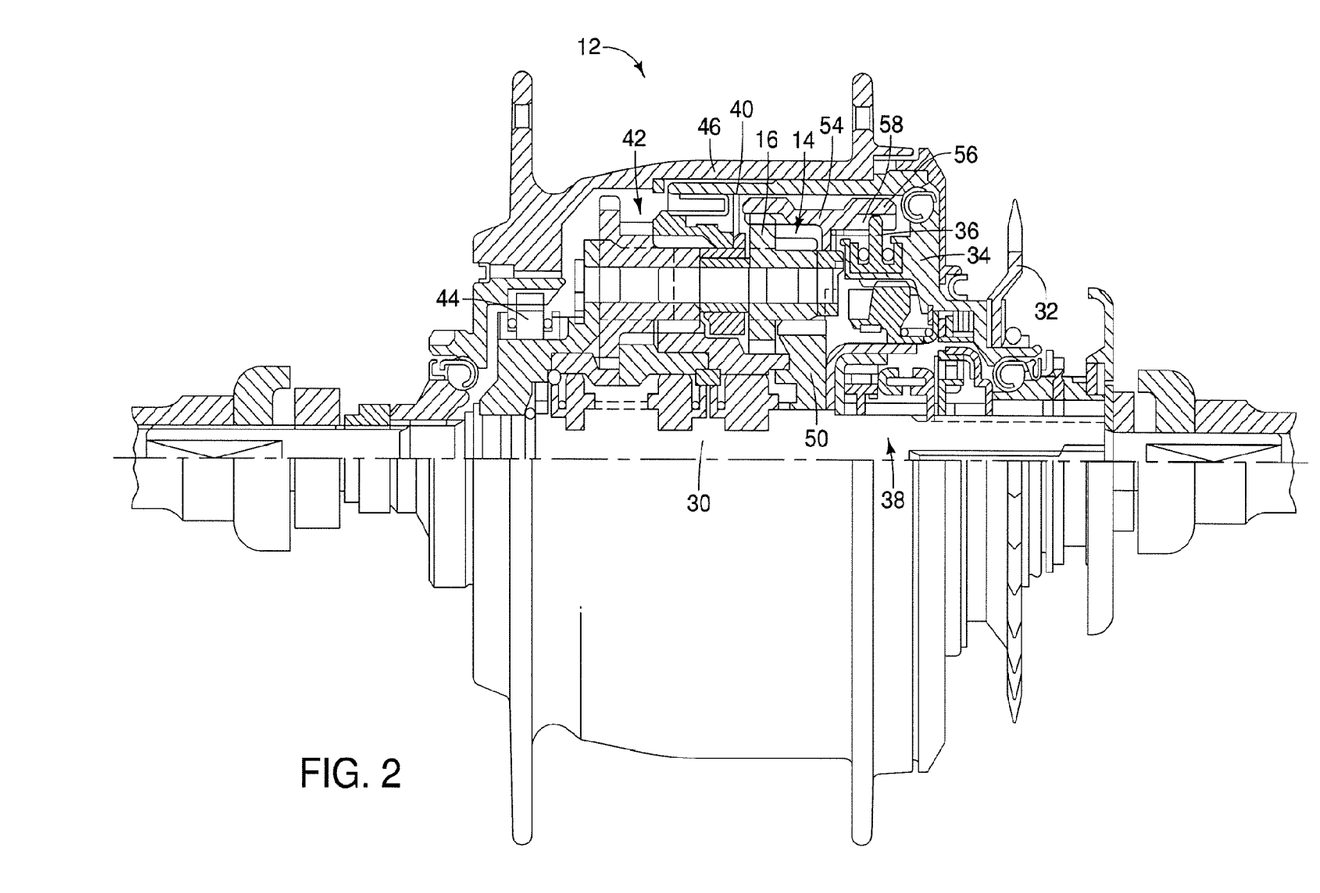
FIG. 2 is a cross-sectional view of the internal hub transmission of the bicycle, showing the planetary gear mechanism with a stepped planetary gear in accordance with the one embodiment.

As shown in FIG. 2, the internal hub transmission 12 includes a planetary gear mechanism 14 with a stepped planetary gear 16 that is described in greater detail below.

With reference again to FIG. 1, the bicycle 10 includes, among other things, a frame 20, a crank assembly 22, a chain 24, a rear wheel 26 and the internal hub transmission 12. When the crank assembly 22 is rotated by a cyclist (not shown), the rotation of the crank assembly 22 is becomes torque that is transmitted through the chain 24 to elements of the internal hub transmission 12, and thru the internal hub transmission 12 to the rear wheel 26. The frame 20, the crank assembly 22, the chain 24 and the rear wheel 26 are all conventional bicycle components. Since these conventional components are well known, further description is omitted for the sake of brevity.

As best shown in FIG. 2, the internal hub transmission 12 includes, among other things, a stationary shaft 30, a chain ring 32, a driver 34, a first pawl mechanism 36, a shifting section 38, the planetary gear mechanism 14, a one-way clutch mechanism 40, a second planetary gear mechanism 42, a second pawl mechanism 44 and a hub shell 46. The stationary shaft 30 includes a stationary sun gear 50 (shown in FIGS. 2 and 7). The chain ring 32 engages the chain 24 and transmits torque from the chain 24 to the driver 34 in a conventional manner.

The first pawl mechanism 36 is disposed on portions of the driver 34 and serves as a one-way clutch that selectively transmits torque to the planetary gear mechanism 14.

The shifting section 38 is a conventional shifting mechanism that operates in the same manner as the shifting mechanism in either U.S. Pat. Nos. 5,928,103 and/or 6,607,464 (both assigned to Shimano Inc.). The shifting section 38 engages and disengages certain elements within the internal hub transmission 12 in order to select one of a plurality of torque transmission paths. Specifically, when the driver 34 is rotated, the driver 34 transmits torque to either the first pawl mechanism 36 or directly to a portion of the planetary gear mechanism 14, in a conventional manner. Since operation of the shifting section 38 and the various torque transmission paths of internal hub transmissions are conventional, further description is omitted for the sake of brevity.

Figures 7, 8:
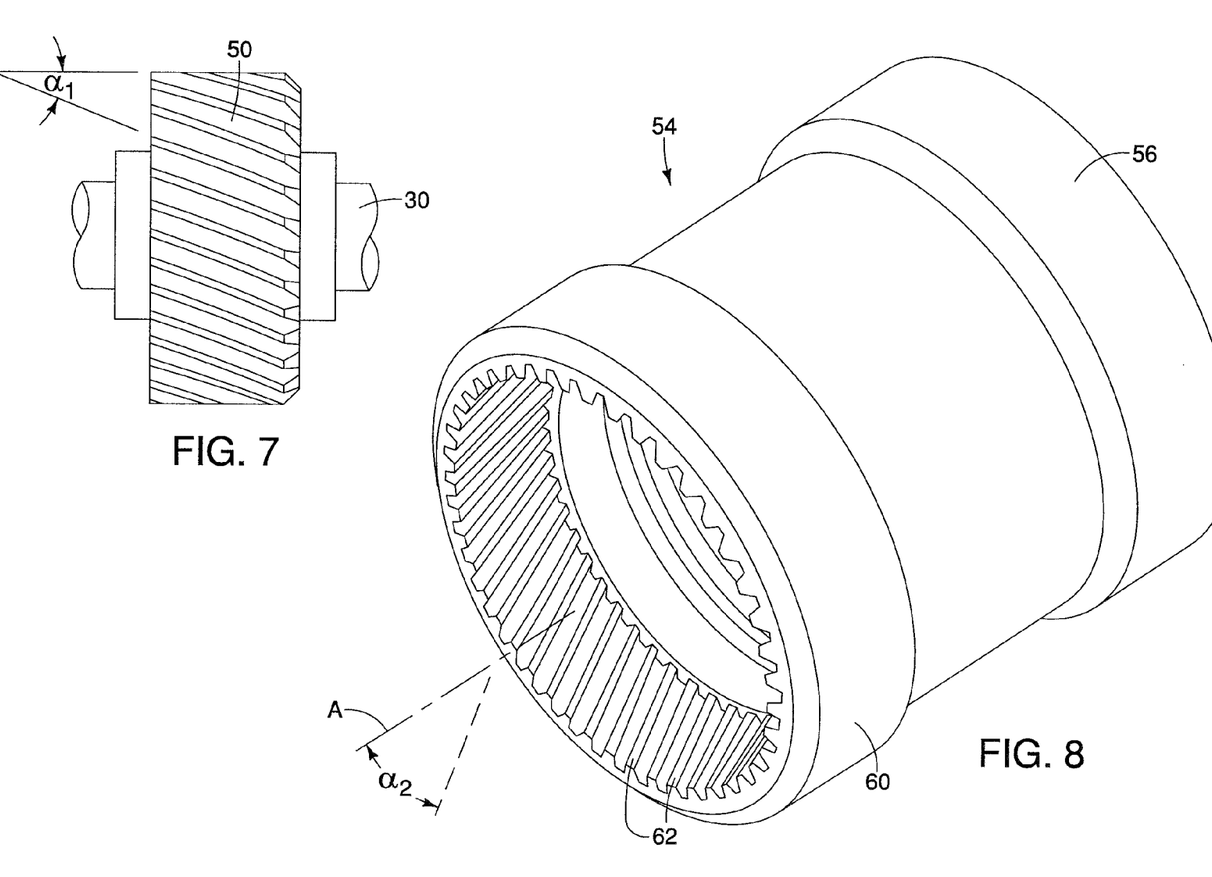
FIG. 7 is a side elevational view a stationary shaft of the internal hub transmission showing a sun gear that meshes with the first helical gear teeth of the stepped planetary gear in accordance with the one embodiment.
FIG. 8 is a perspective view a ring gear of the planetary gear mechanism of the internal hub transmission showing internal helical gear teeth that mesh with the second helical gear teeth of the stepped planetary gear in accordance with the one embodiment.

The planetary gear mechanism 14 includes a ring gear 54 having a first end 56 (FIG. 8) that includes internal gear teeth 58 (FIG. 2) that engage the first pawl mechanism 36 and a second end 60 that includes internal helical gear teeth 62, as best shown in FIG. 8. The planetary gear mechanism 14 also includes a plurality of stepped planetary gears 16, described in greater detail below. It should be understood from the drawings and the description herein that the number of stepped planetary gears 16 included in the planetary gear mechanism 14 depends on various design criteria such as the number of torque transmission paths, and the intended torque capacity of the internal hub transmission 12. For example, a manually powered bicycle (powered by a cyclist) can include 2, 3 or 4 of the stepped planetary gears 16. If the bicycle 10 is designed for operation by a child, or small adult, then the number of stepped planetary gears 16 can be small. However, if the bicycle includes an electric motor and means for operation by a large adult, then the number of stepped planetary gears 16 can be increased.

The second planetary gear mechanism 42 is a conventional planetary gear mechanism and therefore further description is omitted for the sake of brevity.

The second pawl mechanism 44 transmits torque from the second planetary gear mechanism 42 to the hub shell 46 in a conventional manner, depending upon which torque transmission path has been engaged by the shifting section 38.

A description of the stepped planetary gear 16 is now provided with specific reference to FIGS. 3-6, 9 and 10.

The stepped planetary gear 16 includes a first portion 66 and a second portion 68. The first portion 66 includes a plurality of first helical gear teeth 70 and the second portion 68 includes a plurality of second helical gear teeth 72. The first helical gear teeth 70 are configured to mesh with the sun gear 50. The second helical gear teeth 72 mesh with the internal helical gear teeth 62 of the second end 60 of the ring gear 54. Further, the stepped planetary gear 16 is a monolithic, one piece element as viewed in cross-section in FIGS. 5 and 6. The first portion 66 and the second portion 68 together define the unitary one piece element, as is also clearly shown in FIGS. 3 and 4.

Figure 3:
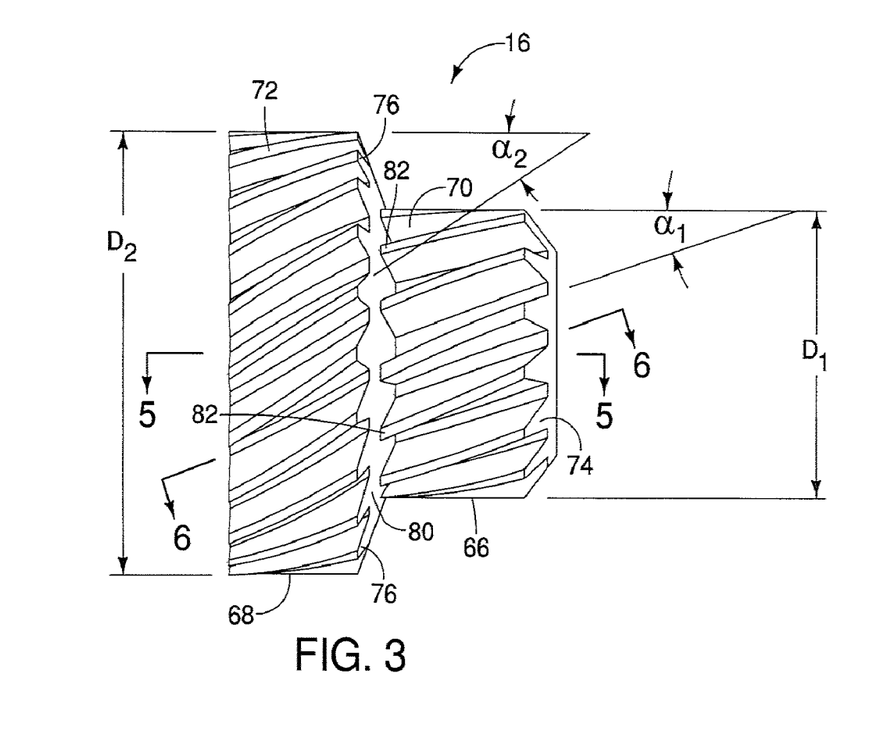
FIG. 3 is a side elevational view of the stepped planetary gear shown removed from the internal hub transmission and the planetary gear mechanism showing a plurality of first helical gear teeth and a plurality of second helical gear teeth in accordance with the one embodiment.

As best shown in FIG. 3, the plurality of first helical gear teeth 70 have a first outer diameter $D_1$ and the plurality of second helical gear teeth 72 have a second outer diameter $D_2$ that is greater than the first outer diameter $D_1$. In the depicted embodiment, there are fourteen (14) of the first helical gear 70 and twenty (20) of the helical gear teeth include 20 gear teeth. However, it should be understood from the drawings and the description herein that the number of gear teeth can be varied according to specific application and is not fixed to the number of teeth shown in the drawings.

The first helical gear teeth 70 have a first helix angle $\alpha_1$ and the second gear teeth 72 have a second helix angle $\alpha_2$, as shown in FIG. 3. In the depicted embodiment, the first helix angle $\alpha_1$ is equal to 20 degrees and the second helix angle $\alpha_2$ is equal to 30.2315 degrees.

As shown in FIG. 7, the helical gear teeth of the sun gear 50 are also formed with the first helix angle $\alpha_1$. As shown in FIG. 8, the internal helical gear teeth 62 of the ring gear 54 are formed with the second helix angle $\alpha_2$.

Figure 4:
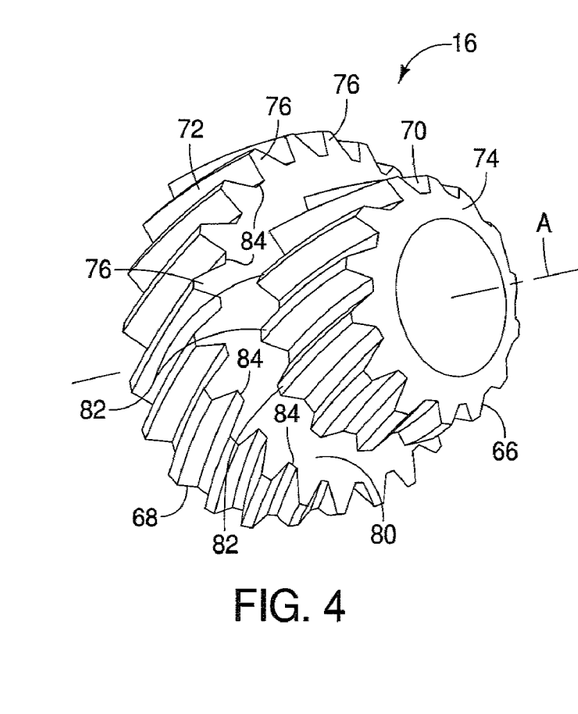
FIG. 4 is a perspective view of the stepped planetary gear shown removed from the internal hub transmission and the planetary gear mechanism in accordance with the one embodiment.
Figure 5:
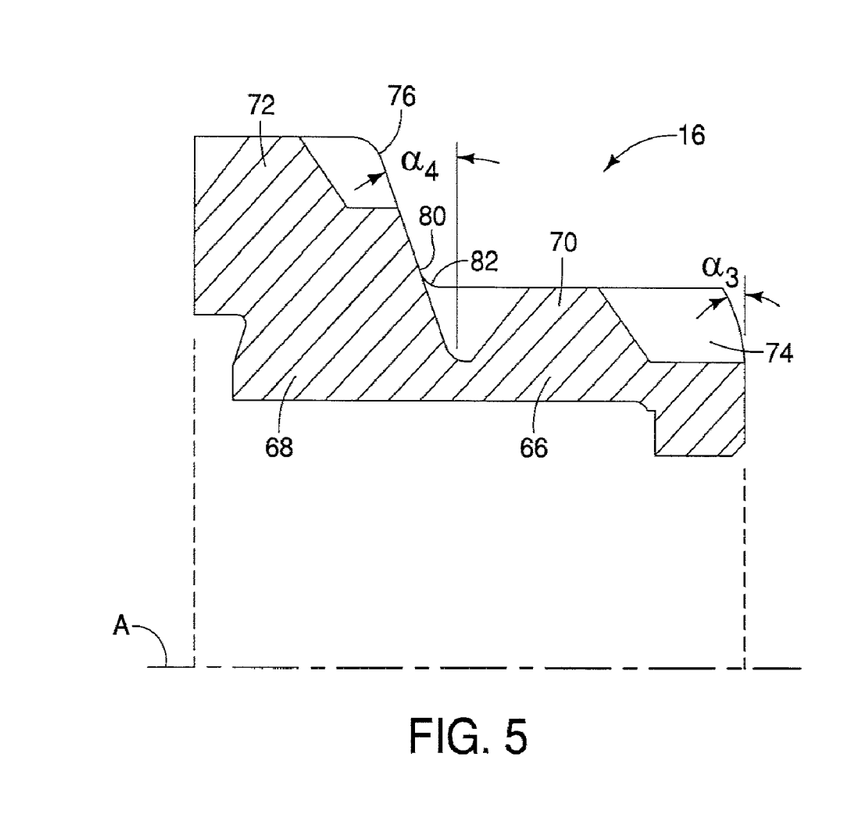
FIG. 5 is a cross-sectional view of a portion of the stepped planetary gear taken along the line 5-5 in FIG. 3 in accordance with the one embodiment.
Figure 6:
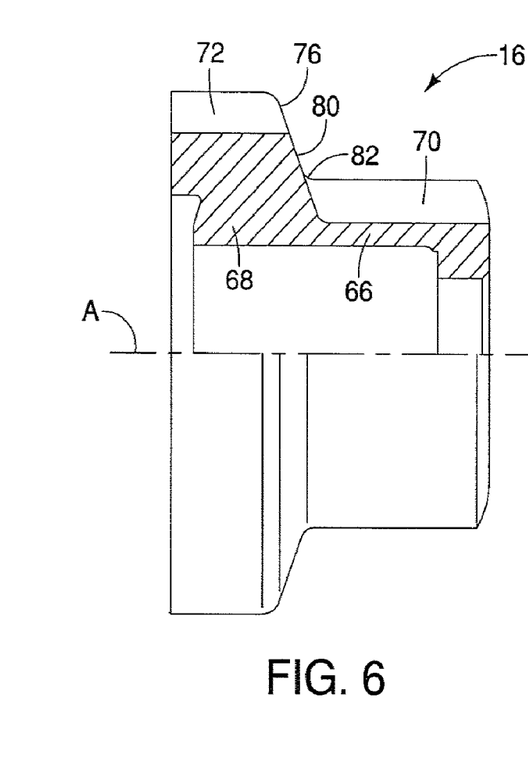
FIG. 6 is a side view and part cross-sectional view of a portion of the stepped planetary gear taken along the line 6-6 in FIG. 3 in accordance with the one embodiment.

Each of the first helical gear teeth 70 has an axial end 74 with a beveled edge. The beveled edge of the axial ends 74 are angularly offset from a line normal to a rotational axis A of the stepped planetary gear 16, as shown in FIG. 4. More specifically, the axial ends 74 of the first helical gear teeth 70 are offset from the line normal to the rotational axis A by an angle $\alpha_3$.

Figure 9:
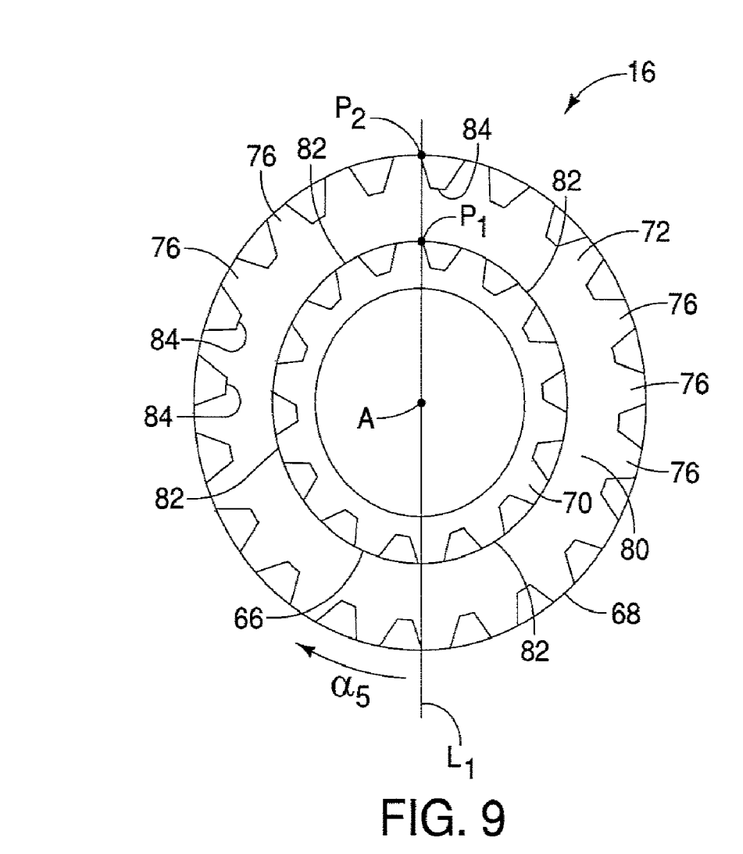
FIG. 9 is an end elevational view of the stepped planetary gear, showing two travel points, one travel point one of the first helical gear teeth and one travel point on one of the second helical gear teeth, the travel points lying in a plane that extends through the rotational axis of the stepped planetary gear.

Similarly, each of the second helical gear teeth 72 has an axial end 76 with a beveled edge. The beveled edge of the axial ends 76 are also angularly offset from a line normal to the rotational axis A of the stepped planetary gear 16, as shown in FIG. 4. More specifically, the axial end 76 of the second helical gear teeth 72 are offset from the line normal to the rotational axis A by an angle $\alpha_4$. As is best shown in FIGS. 3, 4 and 9, the stepped planetary gear 16 also includes an annular surface 80 that extends radially outward from outer axial ends 82 of the first gear teeth 70 to inner axial ends 84 of the second gear teeth 72. The radially outer portion of the annular surface 80 is continuous with the axial ends 76 of the second helical gear teeth 72.

It should be understood from the drawings and the description herein that the first helix angle $\alpha_1$ and the second helix angle $\alpha_2$ can be any of a range of angles where the first helix angle $\alpha_1$ is between 15 and 30 degrees. The second helix angle $\alpha_2$ is determined based upon criteria described in greater detail below.

Specifically, the first helix angle $\alpha_1$ and the second helix angle $\alpha_2$ identified in FIG. 3 are angled such that for a given amount of rotation of the stepped planetary gear 16 a pair of corresponding travel points $P_1$ and $P_2$ (FIGS. 9 and 10) on the first helical gear teeth 70 and the second helical gear teeth 72 move the same axial amount $\beta$ with respect to the rotational axis A.

To better understand the relationship between the first helix angle $\alpha_1$ and the second helix angle $\alpha_2$, the following explanation is provided. A stationary plane represented by the line $L_1$ in FIG. 9 passes through the rotational axis A and also passes through the travel point $P_1$ on one of the first helical gear teeth 70 and through the travel points $P_2$ on one of the second helical gear teeth 72. The travel points $P_1$ and $P_2$ are basically intersection points between the first helical gear teeth 70 and the second helical gear teeth 72 and the stationary plane represented by the line $L_1$.

Thus, as the stepped planetary gear 16 rotates, the travel points $P_1$ and $P_2$ move along the corresponding ones of the first helical gear teeth 70 and the second helical gear teeth 72, and eventually move from tooth to tooth.

Figure 10:
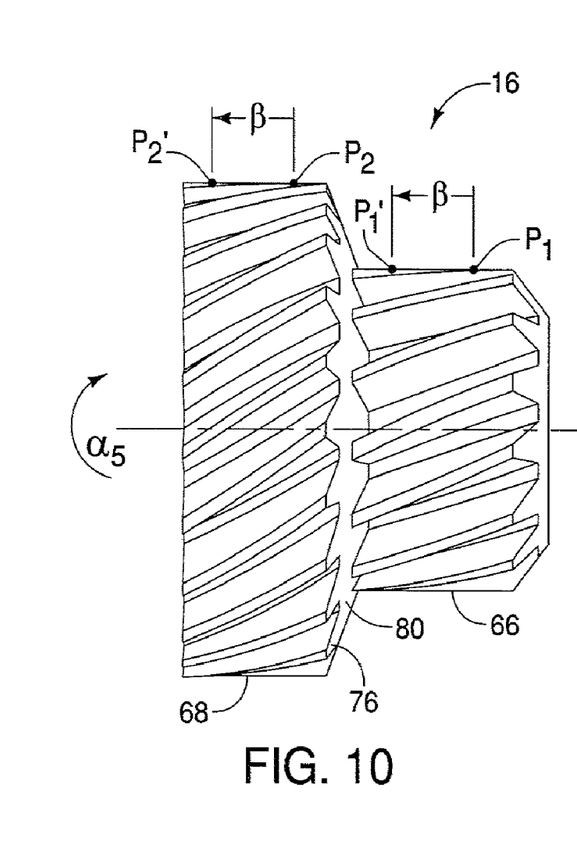
FIG. 10 is another side elevational view of the stepped planetary gear similar to FIG. 3, showing movement of the travel points relative to the first helical gear teeth, the second helical gear teeth and the rotational axis in accordance with the one embodiment.

As indicated in FIG. 10, as the stepped planetary gear 16 rotates by, for example, a small angle $\alpha_5$, the travel points $P_1$ and $P_2$ (the points of intersection with the plane $L_1$) both move the same distance $\beta$ to travel locations $P_1'$ and $P_2'$ along respective ones of the first helical gear teeth 70 and the second helical gear teeth 72. In other words, as the stepped planetary gear 16 rotates a specific angular distance, such as the angle $\alpha_5$, the intersection points, or travel points $P_1$ and $P_2$ both move the same distance $\beta$ in the axial direction.

More specifically, the distance between travel point $P_1$ and the travel location $P_1'$ is equal to the distance $\beta$ for the angular displacement angle $\alpha_5$. As well, the distance between travel point $P_2$ and the travel location $P_2'$ is also equal to the distance $\beta$ for the angular displacement angle $\alpha_5$.

Thus, for the stepped planetary gear 16, the relationship between the first helix angle $\alpha_1$ and the second helix angle $\alpha_2$, the corresponding diameters $D_1$ and $D_2$, and the number of gear teeth on each of the first and second helical gear teeth 70 and 72 are determined such that the pair of corresponding travel points $P_1$ and $P_2$ on the first helical gear teeth 70 and the second helical gear teeth 72 move the same axial amount β with respect to the rotational axis A.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the planetary gear mechanism for a bicycle internal hub transmission. Accordingly, these terms, as utilized to describe the planetary gear mechanism for a bicycle internal hub transmission should be interpreted relative to a bicycle equipped with the planetary gear mechanism for a bicycle internal hub transmission as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle internal hub transmission comprising:
a stationary shaft;
a hub shell rotatable about the stationary shaft;
a driver rotatable about the stationary shaft; and
a planetary gear mechanism disposed within the hub shell to selectively transmit rotary power from the driver to the hub shell, the planetary gear mechanism including:
at least one stepped planetary gear having a first portion and a second portion, the first portion having a plurality of first helical gear teeth with a first outer diameter and the second portion having a plurality of second helical gear teeth with a second outer diameter that is greater than the first outer diameter, the first portion and the second portion of the stepped planetary gear being a unitary one piece element as viewed in cross-section, the stepped planetary gear further including an annular surface that begins at first axial ends of the first gear teeth and extends directly radially outward from the first axial ends of the first gear teeth to inner axial ends of the second gear teeth, the annular surface having a frusto-conical shape,
wherein the first helical gear teeth have a first helix angle and the second gear teeth have a second helix angle with the first and second helix angles being angled such that for a given amount of rotation of the stepped planetary gear corresponding travel points on the first and second helical gear teeth move the same axial amount with respect to the rotational axis of the stepped planetary gear.

2. The bicycle internal hub transmission according to claim 1, wherein
each of the plurality of first helical gear teeth have second axial end that includes a beveled edge.

3. The bicycle internal hub transmission according to claim 2, wherein
the first helix angle is equal to 20 degrees.

4. The bicycle internal hub transmission according to claim 3, wherein
the second helix angle is equal to 30.2315 degrees.

5. The bicycle internal hub transmission according to claim 1, wherein
each of the plurality of second helical gear teeth have an outer axial end that includes a beveled edge.

6. The bicycle internal hub transmission according to claim 5, wherein
the second helix angle is equal to 30.2315 degrees.

7. The bicycle internal hub transmission according to claim 1, wherein
the plurality of first helical gear teeth include 14 gear teeth.

8. The bicycle internal hub transmission according to claim 7, wherein
the first helix angle is equal to 20 degrees.

9. The bicycle internal hub transmission according to claim 7, wherein
the second helix angle is equal to 30.2315 degrees.

10. The bicycle internal hub transmission according to claim 1, wherein
the plurality of second helical gear teeth include 20 gear teeth.

11. The bicycle internal hub transmission according to claim 1, wherein
the planetary gear mechanism includes a plurality of the stepped planetary gears.

12. A bicycle internal hub transmission comprising:
a stationary shaft;
a hub shell rotatable about the stationary shaft;
a driver rotatable about the stationary shaft; and
a planetary gear mechanism disposed within the hub shell to selectively transmit rotary power from the driver to the hub shell, the planetary gear mechanism including:
at least one stepped planetary gear having a first portion and a second portion, the first portion having a plurality of first helical gear teeth with a first outer diameter and the second portion having a plurality of second helical gear teeth with a second outer diameter that is greater than the first outer diameter, the first portion and the second portion of the stepped planetary gear being a unitary one piece element as viewed in cross-section, the stepped planetary gear further including an annular surface that extends radially outward from the first axial ends of the first gear teeth to inner axial ends of the second gear teeth, the annular surface having a frustoconical shape;

the first helical gear teeth having a first helix angle and the second gear teeth have a second helix angle with the first and second helix angles being angled such that for a given amount of rotation of the stepped planetary gear corresponding travel points on the first and second helical gear teeth move the same axial amount with respect to the rotational axis of the stepped planetary gear.

13. The bicycle internal hub transmission according to claim 12, wherein
the annular surface has a radial inner end at the first gear teeth and a radial outer end at the second gear teeth, the annular surface having a continuously increasing diameter extending from the radial inner end to the radial outer end.

14. The bicycle internal hub transmission according to claim 12, wherein
the annular surface has a radial inner end at the first gear teeth and a radial outer end at the second gear teeth, the annular surface defining a straight line from the radial inner end to the radial outer end as viewed from a lateral side thereof.

15. The bicycle internal hub transmission according to claim 12, wherein the first helix angle is equal to 20 degrees.

16. The bicycle internal hub transmission according to claim 15, wherein the second helix angle is equal to 30.2315 degrees.

17. A bicycle internal hub transmission comprising:
a stationary shaft;
a hub shell rotatable about the stationary shaft;
a driver rotatable about the stationary shaft; and
a planetary gear mechanism disposed within the hub shell to selectively transmit rotary power from the driver to the hub shell, the planetary gear mechanism including:
at least one stepped planetary gear having a first portion and a second portion, the first portion having a plurality of first helical gear teeth with a first outer diameter and the second portion having a plurality of second helical gear teeth with a second outer diameter that is greater than the first outer diameter, the first portion and the second portion of the stepped planetary gear being a unitary one piece element as viewed in cross-section, the stepped planetary gear further including an annular surface that extends radially outward from first axial ends of the first gear teeth to inner axial ends of the second gear teeth without an axial gap between the first axial ends of the first gear teeth and the annular surface, the annular surface having a frustoconical shape, the first helical gear teeth having a first helix angle and the second gear teeth have a second helix angle with the first and second helix angles being angled such that for a given amount of rotation of the stepped planetary gear corresponding travel points on the first and second helical gear teeth move the same axial amount with respect to the rotational axis of the stepped planetary gear.

18. The bicycle internal hub transmission according to claim 17, wherein
the annular surface has a radial inner end at the first gear teeth and a radial outer end at the second gear teeth, the annular surface having a continuously increasing diameter extending from the radial inner end to the radial outer end.

19. The bicycle internal hub transmission according to claim 17, wherein the first helix angle is equal to 20 degrees.

20. The bicycle internal hub transmission according to claim 19, wherein the second helix angle is equal to 30.2315 degrees.

* * * * *